United States Patent [19]

Ui et al.

[11] Patent Number: 4,575,147
[45] Date of Patent: Mar. 11, 1986

[54] VEHICLE DOOR

[75] Inventors: Yoshio Ui, Niiza; Yukio Kurosu, Urawa, both of Japan

[73] Assignee: Honda Giken Kogyo Kabushiki Kaisha, Tokyo, Japan

[21] Appl. No.: 605,501

[22] Filed: Apr. 30, 1984

[30] Foreign Application Priority Data

May 2, 1983 [JP] Japan .............................. 58-65034[U]

[51] Int. Cl.⁴ .............................................. B60J 7/18
[52] U.S. Cl. .................................... 296/154; 296/213; 49/462
[58] Field of Search ............... 296/146, 154, 201, 210, 296/213; 49/488, 462

[56] References Cited

U.S. PATENT DOCUMENTS 2,226,615 12/1940 Killen .................................... 49/462
3,596,980 8/1971 Cadion ................................. 296/154
3,641,707 2/1972 Kellos ................................... 49/462

Primary Examiner—Robert R. Song
Attorney, Agent, or Firm—Armstrong, Nikaido, Marmelstein & Kubovcik

[57] ABSTRACT

A door of an automotive vehicle has a reveal an upper portion of which is extended toward a side edge of a roof of the vehicle. A molding made of an elastic material is fit on the upper extension of the reveal. The molding is constructed and arranged such that it protrudes toward the roof beyond the upper edge of the reveal and has an upper portion thereof located above the side edge of the roof.

12 Claims, 4 Drawing Figures

VEHICLE DOOR

BACKGROUND OF THE INVENTION

The present invention relates to a door of an automotive vehicle and, more particularly, to a vehicle door of the type having an upper portion of a reveal thereof extended toward a side edge of a roof.

In some modern automotive vehicles, particularly those having relatively low heights, an edge of the roof which faces the upper edge of a door is recessed while the upper edge of the reveal of the door is extended toward the roof, the extension of the reveal functioning as a roof side portion. Such a roof and door configuration allows the motor vehicle to be furnished with a wide opening for a door which promotes the ease of one's movement into and out of the vehicle.

In an automotive vehicle with a door of the type described, it has been customary to construct the door such that the upper surface of the upper extension of the reveal coninicides with the general plane of the roof. Usually, the general plane of a roof of an automotive vehicle has a curvature which is progressively lowered toward the sides of the vehicle. A gap is defined between the edge of the upper door extension and the side edge of the roof to serve as a trough for draining water which flows down along the roof, as disclosed in, for example, U.S. Pat. No. 3,596,980 to Jean G. Cadiou. In such a vehicle configuration, a difference in level is visible between the roof and the door when the vehicle is seen from the side, causing the door to appear ill-fitting. Furthermore, while the vehicle is operated in the heavy rain, for example, the water flowing down along the roof toward a side tends to jump across the gap between the roof and the door upper edge to directly reach the door, which is on the extension of the curvature of the roof, the gap failing to sufficiently function as a trough.

Meanwhile, a vehicle door is generally assembled by hemming edge portions of a door inner panel and a door outer panel. In a door with the extended upper edge, therefore, a thin hemming flange is formed in the extension which protrudes from the door surface when the door is opened. Such a projection is apt to contact other objects and, moreover, coating tends to come off at the end of the thin flange to cause corrosion to start there.

SUMMARY OF THE INVENTION

The present invention contemplates to eliminate the above-described various drawbacks heretofore encountered with an automotive vehicle of the type having a door whose upper end portion is extended toward a roof.

It is therefore an object of the present invention to improve the external view of an automotive vehicle by making the difference in level between the roof and the door upper edge invisible when the vehicle is seen from the side.

It is another object of the present invention to insure good sidewise visibility of an autumitive vehicle even in the heavy rain by preventing water on the roof from flowing down onto the door.

It is another object of the present invention to eliminate damage to the thin flange at the door upper edge portion which extends from the door surface by keeping it from other objects.

In order to achieve these objects, a vehicle door in accordance with the present invention includes a molding made of an elastic material and fit on an extension which extends upwardly from the upper end of a reveal of the door. The end face of the molding protrudes toward a roof of the vehicle beyond the edge of the extension, while an upper portion of the upper surface of the molding is positioned above a side edge of the roof.

While the upper surface of the extension of the reveal may coincide with the general plane of the roof as in the prior art configuration, it is permissible to form in the upper surface itself a portion which is positioned above the roof side edge. It is desirable that the molding be detachably fit on the door.

Such a molding serves to conceal the roof side edge by its upper surface portin even when the vehicle is seen from a side. Meanwhile, water flowing down along the roof toward the side edge is intecepted by the molding before reaching the door. When another object is about to touch the upper edge of the door, the elastic molding protruding from the door edge contacts the object first, protecting both the door edge and the object from damage.

These and other objects, features and advantages of the present invention will become apparent from the following description taken in conjunction with the accompanying drawings, which illustrate preferred embodiments of the present invention.

DESCRIPTION OF THE PREFERRED EMBODIMENTS

Figure 1:
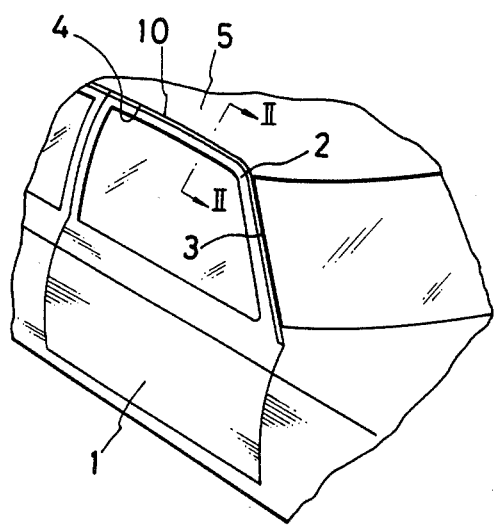
FIG. 1 is a schematic perspective view of part of an automotive vehicle to which a door of the present invention is applied.

Referring to FIG. 1, a front door 1 of an automotive vehicle is shown and includes a reveal 2. A frot portion of the reveal 2 has an edge 3 which extends as far as the outside of a front pillar, while an upper portion of the reveal 2 has an edge 4 which extends as far as the vicinity of the upper surface of a roof 5.

Figure 2:
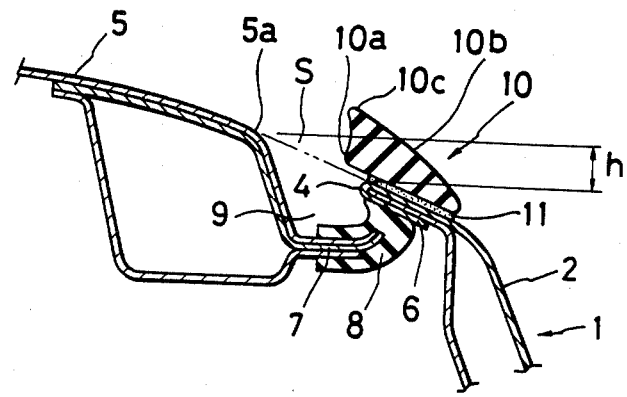
FIG. 2 is an enlarged section along line II—II of FIG. 1.

As shown in FIG. 2, an upper extension 6 of the reveal 2 is formed as a hemming flange. The upper surface of the extension 6 coincides with a smooth plane extending along the top of the roof, i.e. general plane S of the roof 5. When the door 1 is closed, a gap is defined between a side edge 5a of the roof 5 and the edge 4 of the extension 6 while a weather strip 8 fit on a flange 7 at a roof side edge portion abuts against the reveal 2. Under this condition, the gap between the roof and the door forms a trough 9.

An elastic molding 10 made of vinyl chloride or like material is securely fit on the upper extension 6 of the reveal 2 by means of a two-sided pressure sensitive adhesive tape 11 by way of example. As shown in FIG. 2, the molding 10 has an end face 10a which protrudes beyond the edge 4 of the extension 6 toward the roof 5. The molding 10 also has an upper surface 10b an upper portion of which is located above the roof side edge 5a.

The molding 10 on the door 1 conceals the difference in level h between the roof side edge 5a and the door upper edge 4 even when the vehicle is seen from the side. Also, when water on the roof 5 flows down toward the side of the vehicle as during operation in the rain, it is completely intercepted by the end face 10a of the molding 10 and, thereby, prevented from rushing to the door 1 across the trough 9. To further promote the interception of water, the molding 10 may be additionally formed with a lug 10c in the upper portion of the end face 10a as shown in FIG. 2.

The elastic molding 10 protrudes beyond the edge 4 of the reveal extension 6, which is a thin hemming flange, as previously stated. Therefore, when the edge 4 is about to hit against another object, the molding 10 protects both the edge 4 and the object.

Because the molding 10 is attached to the door 1 by means of the two-sided adhesive tape 11 or the like, it is easily removable from the reveal 2 whenever desired. It is permissible, therefore, to attach the molding 10 to the door 1 only when the vehicle runs in the rain, for example, while keeping it detached from the door 1 under the other conditions.

Figure 3:
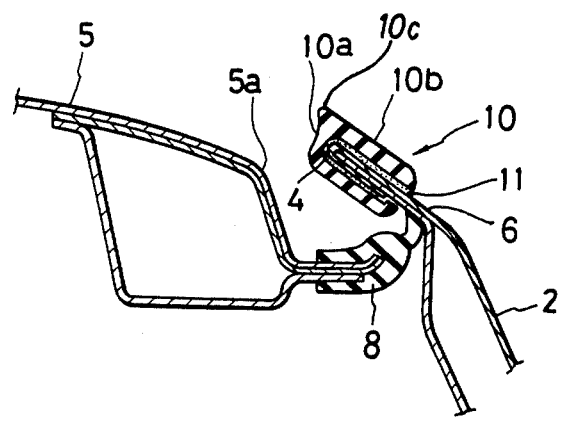
FIGS. 3 and 4 are views similar to FIG. 2 but showing respectively different embodiments of the vehicle door in accordance with the present invention.
Figure 4:
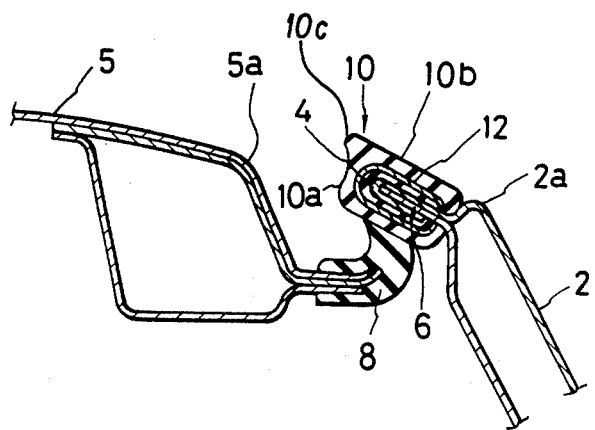

Referring to FIGS. 3 and 4, other embodiments of the present invention are shown. In these drawings, the same or similar structural elements as those shown in FIG. 2 are designated by like reference numerals.

In the embodiment shown in FIG. 3, the edge 4 of the reveal extension 6 itself is located above the side edge 5a of the roof 5. The molding 10 is fit on the extension 6 in such a manner as to nip it from the edge 4 side. In this construction, the end face 10a of the molding 10 projects toward the roof 5 beyond the edge 4 of the reveal extension 6, while the upper surface 10b includes a portion which is higher in level than the roof side edge 5a. The configuration shown in FIG. 3 trims the molding 10 in required thickness, compared to the molding 10 in FIG. 2, and allows it to be more positively mounted on the reveal extension 6.

In the embodiment shown in FIG. 4, a resilient metal core 12 is embedded in the molding 10. This type of molding 10 firmly nips the reveal extension 6 due to the resiliency of the metal core 12. The resiliency of the metal core 12 will add to the ease of attachment and detachment of the molding 10. In this particular embodiment, part 2a of the reveal 2 which neighbors the molding 10 is protruded upwardly so that the molding 10 may smoothly connect to the external surface of the reveal 2.

While the foregoing description has concentrated to a front door of a vehicle, the present invention is similarly applicable to a two-door vehicle or to a rear door of a four-door vehicle, for example. In the case of a two-door vehicle, a molding similar to any of the described ones may be fit between a rear side panel of the vehicle body and the roof such that it appears as part of a continuous molding which extends along a side of the roof. Concerning a four-door vehicle, such a molding is attached to a rear door, too. Further, it is preferable that the front door of a four-wheel vehicle be furnished with such a molding along the front edge 3 (FIG. 1) as well as the upper edge described.

Various modifications will become possible for those skilled in the art after receiving the teachings of the present disclosure without departing from the scope thereof.

What is claimed is:

1. A door of an automotive vehicle, comprising:
   an elastic molding fit on an extension of an upper portion of a reveal of a door which is extended toward a side edge of a roof of the vehicle, said elastic molding including an end face which protrudes toward the roof beyond an edge of said extension and an upper surface, an upper portion of which is positioned above the side edge of the roof, said end face of the molding which protrudes toward the roof being provided with a lug in an upper portion thereof.

2. A door as claimed in claim 1, in which the molding is fit on the extension of the reveal by a two-sided pressure sensitive adhesive tape.

3. A door as claimed in claim 1, in which the extension of the reveal is formed as a thin flange, the molding being fit on the extension by nipping the extension.

4. A door as claimed in claim 3, in which a resilient metal core is embedded in the molding.

5. A door as claimed in claim 1, in which the edge of the extension of the reveal is positioned above the side edge of the roof.

6. A door as claimed in claim 1, in which the upper surface of the molding and an external surface of the reveal connect smoothly to each other.

7. A door of an automotive vehicle, comprising:
   (a) an extension of an upper portion of a reveal of a door which is extended toward a side edge of a roof of the vehicle, said extension having an upper surface which conicides with a smooth plane extending along the top of the roof; and
   (b) an elastic molding fit on said extension and having an end face which protrudes toward the roof beyond an edge of said extension and an upper surface, an upper portion of which is positioned above the side edge of the roof.

8. A door according to claim 7, in which said end face of the molding which protrudes toward the roof is provided with a lug in an upper portion thereof.

9. A door according to claim 7, in which the molding is fit on the extension of the reveal by a two-sided pressure sensitive adhesive tape.

10. A door of an automotive vehicle, comprising:
    (a) an extension of an upper portion of a reveal of a door which is extended toward a side edge of a roof of the vehicle; and
    (b) an elastic molding fit on said extension and having an end face which protrudes toward the roof beyond an edge of said extension and an upper surface, an upper portion of which is positioned above the side edge of the roof, part of the upper portion of the reveal which neighbors the molding being protruded upwardly, said upper surface of the molding being connected smoothly to an external surface of the reveal.

11. A door according to claim 10, in which the extension of the reveal is formed as a thin flange, the molding being fit on the extension by nipping the extension.

12. A door according to claim 11, in which a resilient metal core is embedded in the molding.

* * * * *